3,002,830
METHOD OF MANUFACTURING SOLID PROPELLANTS HAVING A POLYMERIC FUEL-BINDER USING A PLURALITY OF CROSSLINKING AGENTS
Claude James Barr, Herrin, Ill., assignor to Olin Mathieson Chemical Corporation, East Alton, Ill., a corporation of Virginia
No Drawing. Filed Jan. 2, 1959, Ser. No. 784,463
4 Claims. (Cl. 52—.5)

This invention relates to propellants and more specifically to an improved method for the manufacture of composite solid propellants of the type used for the propulsion of rockets.

Composite solid rocket propellant grains normally consist of one or more solid inorganic or organic oxidizer materials uniformly distributed through a matrix of a fuel-binder material. In addition, the propellant may contain liquid and solid additives to enhance the ballistic and physical performance of the product. The rocket grains are generally made by mixing the solid particulate material with the liquid matrix which is solidified after a uniform dispersion of the solid materials has been obtained. These processes are quite difficult to control and result in the production of a large percentage of non-uniform grains. Such difficulties center about the viscosity and the control of curing of the liquid matrix. Thus, in prior practice, the manufacture of such propellants was completely dependent on the relatively uncontrollable curing rate of the matrix. In order to obtain uniform propellent bodies, the curing of the matrix must be carefully controlled for the formation and maintenance of a stable homogeneous mixture and at the same time it must remain liquid and flowable for a sufficient period of time to be worked and cast in a suitable mold. When the curing period is not carefully controlled, the granular material of the propellant will stratify or settle or, on the other hand, will set up so fast that it becomes practically impossible to obtain a uniform dispersion throughout the matrix.

It is, therefore, an object of this invention to provide a novel process for the manufacture of composite solid propellants overcoming the disadvantages of the prior art. It is also an object of this invention to provide an improved novel method for the production of composite solid propellants. It is a more specific object of this invention to provide an improved process for the manufacture of composite solid propellants in which the viscosity of the matrix can be readily controlled.

In accordance with this invention, generally stated, these and other objects are accomplished by curing a liquid linear polymer binder of a solid composite propellant by means of a plurality of cross-linking agents having different reactivities with the polymer chain. "Polymer" as used herein includes those polymerized products resulting from the reaction of one or more types of monomers, and in the stricter sense copolymers of two monomers, terpolymers of three monomers, etc. More specifically, this invention contemplates a method of making solid propellent grains by mixing one or more oxidizing agents and suitable additives with a liquid linear polymer (or copolymer, or terpolymer, etc.) having active centers for cross-linking in the presence of a plurality of cross-linking agents. Only one of these cross-linking agents is reactive with the polymer at the temperature of the mixing system while the remaining cross-linking agents become active only when the mixture is heated to a higher temperature during the final curing operation. The cross-linking is accomplished by the chemical reaction of a bi-functional compound with active centers in the linear chain polymer and is accompanied by a marked increase in the viscosity of the system. The utilization of cross-linking agents having different reactivities toward the linear polymer results in a step-wise increase in the viscosity of the system.

Thus, in accordance with this invention, the liquid polymeric matrix can be partially cured or thickened to provide a predetermined mix fluidity during the mixing operation and then further cured after it has been cast. The increase in viscosity during the mixing operation is sufficient to prevent stratification or settling of the solid phases within the liquid portion of the uncured propellant during the casting operation but does not hinder efficient dispersion of the solids with a minimum work input to the mixer. In other words, time is available in the mixing phase to accomplish all necessary wetting and dispersion operations and is not dependent upon or limited by progressively increasing viscosity of the system. The inactivity of the final curing agents during the mixing operation may be predicated on any of a number of factors. For example, such curing agent may remain as an insoluble solid at mix temperatures but become a reactive liquid at cure temperatures, or although liquid, it may require higher activation energy. Alternatively, it may react with a third component to create a new and reactive compound which then becomes the second cure agent, or may undergo chemical change to become a new and reactive compound.

One type of polymer particularly well suited to the process of this invention is the class of copolymers based upon unsaturated carboxylic acids of the acrylic acid type. These include acrylic acid, methacrylic acid, sorbic acid, beta-acryloxypropionic acid, ethacrylic acid, 2-ethyl-3-propylacrylic acid, vinylacrylic acid, cinnamic acid, maleic acid, fumaric acid, and several other polymerizable organic acids. Polymers based on such acids are the result of their copolymerization with one or more olefins or diolefins such as styrene, acrylonitrile, methacrylonitrile, vinylidene chloride, butadiene, isoprene, 2,3-dimethylbutadiene, chloroprene, and the like. In addition to such polymerizable olefin-acid combinations, various other materials may be used as the matrix in accordance with this invention. For example, systems utilizing binders based on polyurethanes, nitrocellulose, polyesters, polyethers, and polyamides are also satisfactory.

The only requirement of the liquid polymeric binder is that it have active cross-linking centers. When polymers based upon unsaturated carboxylic acids are used as the binder any cross-linking agents that are reactive with the carboxyl groups in the polymer chain may be utilized. The epoxides have been found particularly efficacious in this connection. The diglycidyl ether of glycerol represents a preferred cross-linking agent that is active at mixing temperatures while such a cross-linking agent operative only at higher temperatures is represented by the reaction product of epichlorohydrin and bisphenol-A (the condensation product of phenol and acetone). Similarly, other suitable cross-linking or curing agents can be utilized, their identity being based on the characteristics of the particular polymer used. For example, when liquid polyurethanes are employed, trimethylol propane is a suitable low temperature curing agent while pentaerythritol serves well as a high temperature curing agent. In the case of a nitrocellulose-containing liquid matrix, diisocyanate systems may be employed as cross-linking agents.

The amount of the curing agents used will, of course, vary with their reactivity and also with the particular binder employed. It has been found, however, in practically all cases that the amount of the curing agent operative at curing temperatures must be maintained within about 1% to 15% of the weight of the liquid linear polymer whereas the amount of the high temperature curing agents can vary between about 2% and 10%. When the amounts of the curing agents are less than these proportions, the curing action, if it proceeds at all, is at an exceedingly slow rate. On the other hand, when the amounts in excess of these limits are used, the increase in viscosity of the matrix is exceedingly rapid and not susceptible to control.

The composite propellants made in accordance with this invention are composed of from about 12% to about 30% of the combination of linear polymeric binder and curing agent and from about 70% to about 88% inorganic oxidizing agents, ballistic modifiers, and other suitable additives necessary to achieve the desired performance of the propellant. When the propellant contains less than about 12% matrix, it has undesirable physical properties, exhibits definite deficiencies in physical strength and is difficult to process. The physical properties of the propellant improve as the matrix content is increased. However, when this value exceeds about 30%, the propellant again exhibits physical and ballistic deficiencies such as lack of strength to withstand field handling, acceleration, etc., and difficulty in ignition, decreased total energy, smoky or carbonaceous exhaust products, etc.

Any solid inorganic or organic oxidizing agent capable of reacting with the matrix and other fuel ingredients in combustion processes can be used. Such suitable oxidizing agents include ammonium perchlorate, potassium perchlorate, lithium perchlorate, ammonium nitrate, potassium nitrate, lithium nitrate, hydrazine nitrate, and the like. Also, suitable organic derivatives of nitrous acid, nitric acid, hydrogen peroxide, nitramide, chromic acid and perchloric acid can be employed as oxidizers. Compounds of this group that are particularly advantageous include cyclonite, homocyclonite, pentaerythritol tetranitrate, trinitrotoluene, and the like. Other suitable oxidizing agents are those which furnish fluorine in addition to, or rather than, oxygen. Combustion processes between the fuel components (including the matrix) of the propellant and this class of oxidizers result in the formation of the fluorides of hydrogen, carbon, metal atoms, etc., and some oxides, in accordance with the conditions of temperature and pressure attending such combustion. Also, when specific characteristics are required, two or more inorganic or organic oxidizing agents may be mixed together in the propellent composition. In addition, the propellant can also contain various components to enhance the properties of the propellant. Thus, various oxidizer decomposition catalysts can be employed as well as materials such as ammonium oxalate, ammonium nitrate, oxamide and the like, which serve to cool the gases generated by the propellant. Also, the composition can be provided with different ballistic potential by the incorporation of carbon black, copper chromite, ferrocene or other suitable rate catalysts. The propellant can also contain finely divided metallic components such as aluminum, magnesium, beryllium, and the like.

The manner in which the objects and advantages of this invention are achieved will be more readily understood by reference to the following specific example of a preferred embodiment thereof. In this embodiment, as well as throughout the application, all proportions are expressed in parts by weight unless otherwise specified.

About 17 parts of a liquid butadiene-acrylic acid copolymer were mixed with about 0.75 part of the diglycidyl ether of glycol and about 2.25 parts of the reaction product of epichlorohydrin and bisphenol-A in a sigma blade mixer. Several other types of mixers can also be used. About 70 parts of ammonium perchlorate were then added and the mixing continued for about 15 minutes, at which time the particles of the ammonium perchlorate were largely coated with the still liquid matrix. At this point, about 10 parts of finely-divided metallic aluminum powder were added. The addition of the aluminum powder was delayed until the ammonium perchlorate had been thoroughly coated to minimize contact and thereby reduce the possibility of premature reaction between the ammonium perchlorate and the aluminum. The temperature was then increased from room temperature, about 20° C., to a temperature of about 38° C.–40° C. Mixing was continued at this temperature for about 30 minutes to insure uniform distribution of the solid particulate material throughout the polymeric matrix. During this period, the viscosity of the matrix increased appreciably, to about 40,000–50,000 poises, due to the reaction of the diglycidyl ether of glycerol upon the carboxyl groups in the chains of the binder. This increase in viscosity was sufficient to preclude any stratification after casting but did not require any appreciable increase in the power supplied to the agitation system.

The liquid mixture was then transferred from the mixer into a casting can, through a deaeration hopper to evacuate all entrapped gases from the propellant. The mixture, devoid of entrapped air or vapor, was then entered into a cylindrical rocket engine about 36 inches long and about 8 inches in diameter. The engine was then placed in an oven and cured for about 48 hours at a temperature of about 77° C.–80° C. While the mixture was at the lower temperatures, the epoxy reaction product of epichlorohydrin and bisphenol-A was non-reactive. However, when the temperature of the system was elevated during the curing operation in the neighborhood of 80° C. this compound was activated and its terminal epoxy groups reacted with the carboxyl groups in the butadiene-acrylic acid copolymer to effect cross-linkage. This cross-linking reaction resulted in the curing of the mix to obtain a solid propellant. The resultant rocket engine propellant was readily ignitable and maintained its combustion at a constant rate due to the uniform distribution of the ingredients therein.

If desired, the butadiene-acrylic acid liquid copolymer can be placed in the mixer together with a curing agent operative at mixing temperature and the aluminum and other solid additives, excepting the perchlorate, added thereto. Then, after these solids are thoroughly dispersed through out the mix or coated with the liquid polymer, the ammonium perchlorate can be added in two or more increments. When the mixture is substantially homogeneous, it can then be mixed under vacuum at a slightly elevated temperature, say about 55° C. Then, when the evacuation is complete, a curing agent which is operative only at elevated temperatures can be added and the batch subjected to additional mixing. The remainder of the process can then be carried out as indicated above.

Although the above embodiment specifies particular components and operating conditions, it will be readily appreciated that these can be modified to obtain compositions having different characteristics without departing from the scope of the present invention. For example, the temperatures employed in effecting the cross-linkage will be dependent upon the particular system utilized and are restricted primarily by the thermal stability of the propellent components. Also, while the above example discloses the casting of the composition directly into a cylindrical rocket engine, the composition can, with equal facility, be cast into any desired shape in any other container, combustible or non-combustible, and in such a manner that any desired portion of the resultant propellent grain is provided with a tenacious inhibitor coating formed by the material comprising or adjacent to the mold.

Since various modifications within the spirit of this invention can be made within the specific embodiment, the detailed description thereof is to be considered as illustrative and not limiting the invention except in accordance with the appended claims.

What is claimed is:

1. A process for the manufacture of solid propellent grains comprising preparing a mixture of up to about 88% of a particulate organic oxidizer with between about 12% and about 30% of a liquid organic polymer selected from the group consisting of polyesters, polyethers, polyamides, polyurethanes and copolymers of carboxylic acids and olefins, a first cross-linking agent being present in amounts between about 1% and about 15% based on the weight of the polymer and operative at mixing temperature, and a second cross-linking agent being present in amounts between about 2% and about 10% based on the weight of the polymer and operative only at temperatures above the mixing temperature, said cross-linking agents being selected from the group consisting of epoxides and polyhydric alcohols, continuing the mixing until the dispersion of the oxidizer in the polymer is substantially uniform and the reaction between the polymer and the first cross-linking agent is substantially complete, placing the mixture in a mold and heating the mixture until the reaction between the polymer and the second cross-linking agent is substantially complete resulting in solidification of the mixture.

2. A process for the manufacture of solid propellant grains comprising mixing up to about 88% of a particulate inorganic oxidizing agent selected from the group consisting of ammonium perchlorate, lithium perchlorate, hydrazine nitrate, ammonium nitrate, potassium nitrate and lithium nitrate, with between about 12% and about 30% of a liquid organic polymer selected from the group consisting of polyesters, polyethers, polyamides, polyurethanes and copolymers of unsaturated carboxylic acids selected from the group consisting of acrylic acid, methacrylic acid, sorbic acid, beta-acryloxypropionic acid, ethacrylic acid, 2-ethyl-3-propylacrylic acid, vinylacrylic acid, cinnamic acid, maleic acid and fumaric acid, with olefinic compounds selected from the group consisting of styrene, acrylonitrile, methacrylonitrile, vinylidene chloride, butadiene, isoprene, 2,3-dimethylbutadiene and chloroprene, a first cross-linking agent being present in amounts between about 1% and about 15% based on the weight of the polymer and operative at mixing temperature, and a second cross-linking agent being present in amounts between about 2% and about 10% based on the weight of the polymer and operative only at temperatures above the mixing temperature, said cross-linking agents being selected from the group consisting of epoxides and polyhydric alcohols, continuing the mixing until the dispersion of the oxidizer in the polymer is substantially uniform and the reaction between the polymer and the first cross-linking agent is substantially complete, placing the mixture in a mold and heating the mixture until the reaction between the polymer and the second cross-linking agent is substantially complete, resulting in solidification of the mixture.

3. The process of claim 1 in which the liquid organic polymer is a copolymer of a carboxylic acid and an olefin and in which the first cross-linking agent is the diglycidyl ether of glycerol and the second cross-linking agent is the reaction product of epichlorohydrin and bisphenol-A.

4. The process of claim 1 in which the liquid organic polymer is a polyurethane and in which the first cross-linking agent is trimethylol propane and the second cross-linking agent is pentaerythritol.

References Cited in the file of this patent
UNITED STATES PATENTS 2,855,372   Jenkins et al. _____ Oct. 7, 1958
2,857,258   Thomas _____ Oct. 21, 1958

OTHER REFERENCES

Chemical and Engineering News, January 6, 1958, pp. 79–81.

Ritchey: Chemical and Engineering News, Nov. 11, 1957, pp. 78–80.

Zaehringer: Chemical Engineering Progress, vol. 51, No. 7, July 1955, page 302.

Blatz: Industrial and Engineering Chemistry, vol. 48, No. 4, April 1956, pages 727–9.

Zaehringer: "Solid Rocket Propellants, Second Stage," American Rocket Co., Box 1112, Wyandotte, Mich., 1958, pp. 209–19.

Arendale: Industrial and Engineering Chemistry, vol. 48, No. 4, April 1956, pp. 725–6.

Chem. and Eng. News, Jan. 6, 1958, pp. 79–81.